United States Patent
Liu et al.

(10) Patent No.: US 11,835,482 B2
(45) Date of Patent: Dec. 5, 2023

(54) **MICROELECTRODE SENSOR FOR DETECTING *STAPHYLOCOCCUS AUREUS* AND PREPARATION AND APPLICATION METHODS THEREOF**

(71) Applicant: Central South University, Changsha (CN)

(72) Inventors: Zhengchun Liu, Changsha (CN); Qingteng Lai, Changsha (CN); Qibin Niu, Changsha (CN); Wei Chen, Changsha (CN); Yanke Zhang, Changsha (CN); Fuliang Wang, Changsha (CN); Mengqiu Long, Changsha (CN); Bo Liang, Changsha (CN)

(73) Assignee: CENTRAL SOUTH UNIVERSITY, Changsha (CN)

(*) Notice: Subject to any disclaimer, the term of this patent is extended or adjusted under 35 U.S.C. 154(b) by 0 days.

(21) Appl. No.: 18/314,552

(22) Filed: May 9, 2023

(65) Prior Publication Data

US 2023/0280302 A1    Sep. 7, 2023

Related U.S. Application Data

(63) Continuation of application No. PCT/CN2022/131133, filed on Nov. 10, 2022.

(30) Foreign Application Priority Data

Nov. 11, 2021  (CN) .......................... 202111354014.X

(51) Int. Cl.
  *G01N 27/327*  (2006.01)
  *G01N 27/48*   (2006.01)

(52) U.S. Cl.
  CPC ......... *G01N 27/3278* (2013.01); *G01N 27/48* (2013.01)

(58) Field of Classification Search
  None
  See application file for complete search history.

(56) References Cited

FOREIGN PATENT DOCUMENTS

| CN | 103048369 A | 4/2013 |
| CN | 110907518 A | 3/2020 |
| CN | 113484390 A | 10/2021 |

OTHER PUBLICATIONS

H. Ben-Yoav, et al., "An Electrochemcial Micro-System for Clozapine Antipsychotic Treatment Monitoring", Electrochimica Acta, 163, p. 260-270, (Year: May 2015).*

(Continued)

*Primary Examiner* — J. Christopher Ball
(74) *Attorney, Agent, or Firm* — Zhigang Ma

(57) ABSTRACT

A microelectrode sensor for detecting *Staphylococcus aureus* and a preparation method and an application method thereof are provided. The microelectrode sensor is a three-electrode system sensor with a platinum wire electrode as a counter electrode and an Ag/AgCl electrode as a reference electrode, and a working electrode is a silver microelectrode modified by chitosan, catechol and *Staphylococcus aureus* aptamers. The microelectrode sensor is constructed based on the microelectrode with micro/nano structure on the surface, dual media (Fc-$Ru^{3+}$), chitosan, and catechol. The working electrode can specifically capture *Staphylococcus aureus*. During the CV test of the microelectrode sensor, the $Cl^-$ in bacteria will be leaked to a surface of the working electrode under the action of local high-field strength, and when $Cl^-$ ions exists, the cathodic reduction peak of the working electrode can be specifically enhanced between 0 to −0.1 V, the goal of specific detection of bacteria can be achieved.

7 Claims, 9 Drawing Sheets

(56) References Cited

OTHER PUBLICATIONS

P. Reich, et al., "Development of An Impedimetric Aptasensor for the Detection of *Staphylococcus aureus*", International Journal of Molecular Science, 18(11): paper No. 2484, 18 pages, (Year: Nov. 2017).*

H.D. Awad, et al., "The impact of deposition time on the morphological and structural characteristics of silver nanoparticles using the DC sputtering process", 2nd International Conference on Physics and Applied Science (ICPAS 2021), 1963(1): paper No. 012108, 7 pages, (Year: Jul. 2021).* https://www.globalspec.com/learnmore/materials_chemicals_adhesives/electrical_optical_specialty_materials/electrical_contact_electrode_materials/electrical_contact_electrode_materials; accessed (Year: Jul. 23, 2023).*

CNIPA, Notification of a First Office Action for CN202111354014.X, dated Jun. 14, 2022.

Central South University (Applicant), Reply to Notification of a First Office Action for CN202111354014.X, w/replacement claims, dated Jun. 23, 2022.

Central South University (Applicant), Supplemental Reply to Notification of a First Office Action for CN202111354014.X, w/ (allowed) replacement claims, dated Jul. 14, 2022.

CNIPA, Notification to grant patent right for invention in CN202111354014.X, dated Aug. 1, 2022.

\* cited by examiner

MICROELECTRODE SENSOR FOR DETECTING *STAPHYLOCOCCUS AUREUS* AND PREPARATION AND APPLICATION METHODS THEREOF

TECHNICAL FIELD

The disclosure relates to the field of biosensors, and more particularly to a microelectrode sensor for detecting *Staphylococcus aureus*, a preparation method of the microelectrode sensor for detecting *Staphylococcus aureus*, and an application method of the microelectrode sensor for detecting *Staphylococcus aureus*.

BACKGROUND

*Staphylococcus aureus* was first discovered and named by Dr. Alexander Ogston in 1880. Typical *Staphylococcus aureus* is spherical, grape-like clusters, about 0.8 micrometers (m) in diameter, and positive for gram staining. *Staphylococcus aureus* is a common pathogenic bacterium that usually colonizes human skin and mucosal surfaces, especially the anterior nares (about 30% of the general population). When the host's immunity is reduced or the skin and mucosal barrier is destroyed, it can enter any organ or into the blood, causing skin and soft tissue infections (pustulosis, folliculitis, and scalded skin syndrome) in mild cases, and serious systemic diseases such as bacteremia, endocarditis, osteomyelitis, hemolytic pneumonia, and toxic shock syndrome in severe cases. While mild skin and mucosal infections are usually self-limiting, severe systemic infections are usually accompanied by high mortality (20%-50%), high recurrence rates (5%-10%), and persistent injuries (more than one-third of survivors). *Staphylococcus aureus* is the main pathogen causing hospital-acquired infections. Due to impaired immune systems and frequent invasive surgeries, up to 2% of hospitalized patients are infected with *Staphylococcus aureus*. The toxicity of *Staphylococcus aureus* is becoming increasingly virulent, and its resistance to antibiotics is also becoming stronger. Methicillin-resistant *Staphylococcus aureus* (MRSA) was first described in 1961 and has posed a serious threat to global public health since its discovery. In developed countries such as the United States, Europe, and Japan, about 40% to 60% of hospital infections with *Staphylococcus aureus* are MRSA. The higher infection rate of MRSA in developing countries (>70%) may be due to the widespread use, improper use, and spread of drug-resistant bacteria in developing countries.

Rapid, effective, and accurate diagnosis of *Staphylococcus aureus* is of great significance for the rapid treatment of infected patients, prevention of infection transmission, and reduction of the formation of drug-resistant strains. The gold standard for the detection of *Staphylococcus aureus* is still the culture method, but it is very time consuming, usually taking 1-2 days to obtain a single colony, and then 1-2 days to obtain chemical identification and drug sensitivity results. In recent years, some rapid and automated detection methods have been developed, such as enzyme-linked immunosorbent assay (ELISA), polymerase chain reaction (PCR), flow cytometry, and mass spectrometry. Although results can be obtained in only 1-5 hours, these methods require expensive instruments, complex sample preparation, and high professional requirements, making them less suitable for remote and impoverished areas or point-of-care testing (POCT). Therefore, there is an urgent need to find a fast, simple, specific, and sensitive method for detecting *Staphylococcus aureus*, which can shorten the diagnostic time, provide an accurate diagnosis for clinical practice, and be applied to POCT systems.

SUMMARY

In view of the technical problems above, the purposes of the disclosure are to provide a microelectrode sensor for detecting *Staphylococcus aureus* and its preparation method and application method.

The solutions provided by the disclosure are as follows.

Specifically, a microelectrode sensor for detecting *Staphylococcus aureus* is provided, the microelectrode sensor is a three-electrode system sensor, its counter electrode is a platinum wire electrode, a reference electrode is an Ag/AgCl electrode, and a working electrode is a silver microelectrode modified by chitosan, catechol and *Staphylococcus aureus* aptamers.

In an embodiment, the working electrode takes the silver microelectrode as a matrix, is coated with the chitosan on the surface of the silver microelectrode and grafted with the catechol and the *Staphylococcus aureus* aptamers onto the chitosan, respectively.

In an embodiment, the surface of the silver microelectrode is distributed with micro/nano scale protrusions and gaps.

Based on the same technical concept, the disclosure also provides a preparation method of a microelectrode sensor for detecting *Staphylococcus aureus*, including the following steps:

(1) Constructing a two-electrode system with the silver microelectrode as a working electrode and a platinum wire as an auxiliary electrode to electrochemically deposit the chitosan on a surface of the working electrode to thereby obtain a chitosan-silver (Chi-Ag) electrode;

(2) Taking the Chi-Ag electrode obtained in the step (1) as a working electrode, Ag/AgCl as the reference electrode, and the platinum wire as the counter electrode, and electrochemically grafting catechol onto a surface of the Chi-Ag electrode to thereby obtain a catechol-chitosan-silver (Cat-Chi-Ag) electrode; and (3) Soaking the Cat-Chi-Ag electrode in an aptamer solution, modifying the aptamer onto a surface of the Cat-Chi-Ag electrode through a reaction between an aldehyde group on the aptamers and an amino group on the chitosan, thereby forming an aptamer-modified electrode.

In an embodiment, the silver microelectrode in the step (1) is a silver microelectrode prepared in one step by using a local electrodeposition method.

The electrochemical deposition method is to place the silver microelectrode in a chitosan solution for electrochemical deposition for 200-500 seconds, and then take out the deposited electrode, rinse the deposited electrode with ultrapure water, and dry the rinsed electrode at room temperature.

In an embodiment, a pH value of the catechol solution used for grafting the catechol in the step (2) is in a range of 7.0-7.6, with a concentration in a range of 4-5 millimoles per liter (mM); nitrogen gas is injected to the catechol solution before preparation to remove air, and nitrogen gas is continuously injected during the preparation process.

In an embodiment, the aptamer solution in the step (3) is a solution with the aptamers dissolved in a phosphate-buffered saline (PBS) buffer, with a modification time in a range of 8-24 hours and a temperature in a range of 0-25° C.

Based on the same technical concept, the disclosure also provides a detection application method of a microelectrode sensor for detecting *Staphylococcus aureus*, including the following steps:
- (a) Acquiring peak currents of specific response signals of the aptamer modified electrode corresponding to standard solutions of *Staphylococcus aureus* of respective concentrations by cyclic voltammetry test at room temperature, and establishing a standard curve equation according to a relationship between the concentrations of *Staphylococcus aureus* and the peak currents;
- (b) Taking or preparing a sample solution to be detected;
- (c) Detecting a peak current of a characteristic peak of the sample solution to be detected in the step (b) by cyclic voltammetry; and
- (d) Substituting the peak current obtained in the step (c) into the standard curve equation in the step (a) to calculate a concentration of *Staphylococcus aureus* in the sample solution to be detected.

In an embodiment, the standard curve equation in the step (a) is obtained by adding the standard solutions of *Staphylococcus aureus* of respective concentrations to a Fc-$Ru^{3+}$ double-electron medium solution of the microelectrode sensor, and the standard curve equation is a two-section equation.

When the concentration C of *Staphylococcus aureus* is taken as $1 \leq C \leq 10$ colony-forming units per milliliter (CFU/mL), the standard curve equation is P (microampere abbreviated as µA)=0.3115 C(CFU/mL)+0.3024 ($R^2$=0.9939).

When the concentration C of *Staphylococcus aureus* is taken as $10^1 < C \leq 10^5$ CFU/mL, the standard curve equation is P (µA)=0.7318 log[C](CFU/mL)+3.4108 ($R^2$=0.9927).

In an embodiment, the Fc-$Ru^{3+}$ double-electron medium solution comprises 50 micromoles per liter (µM) Fe, 50 µM $Ru^{3+}$, and a PBS buffer; before the cyclic voltammetry test, the Fc-$Ru^{3+}$ double-electron medium solution after adding the *Staphylococcus aureus* solution is degassed with nitrogen, and continuously injected nitrogen during the cyclic voltammetry test.

Compared with the related art, the beneficial effects of the disclosure are as follows.

When a voltage is applied to the silver microelectrode, a local high electric field can be generated to break down bacteria near the silver microelectrode. According to this characteristic, the three-electrode system microelectrode sensor with the modified silver microelectrode as the working electrode is constructed. The working electrode of the microelectrode sensor can specifically capture *Staphylococcus aureus*. During the CV test of the microelectrode sensor, the Cl⁻ in the bacteria will be leaked to the surface of the working electrode under the action of local high-field strength. When Cl⁻ ions are present, the cathodic reduction peak of the working electrode between 0 to −0.1V is specifically enhanced, thereby establishing a linear relationship between the increased bacterial concentration and the enhanced current signal and achieving the goal of specific detection of bacteria.

The surface of the silver microelectrode is distributed with micro/nano scale protrusions and gaps, which on the one hand increases the electron exchange ability of the microelectrode sensor; on the other hand, during the CV test, the protruding tip on the electrode surface can generate a strong electric field center. When bacteria are captured by the aptamers, the high-field strength center on the electrode surface can cause intracellular material leakage, leading to a significant increase in the oxide reduction peak of the silver electrode. The sensor has a wide linear range (1-$10^1$ CFU/mL), low detection limit (1 CFU/mL), and high specificity, demonstrating great potential for rapid and ultra-sensitive detection of *Staphylococcus aureus*.

When preparing the microelectrode sensor, the silver microelectrode is performed the electrochemical deposition first, followed by grafting of catechol and the aptamers, so that the working electrode of the prepared microelectrode sensor can achieve specific capture of *Staphylococcus aureus* without affecting the generation of the high electric field to break down bacteria due to the thick electrode modification film. In addition, controlling the deposition time during the deposition process of chitosan can effectively control the thickness of the chitosan film. When grafting catechol, controlling the solution environment and concentration can achieve the optimal redox effect of the grafted catechol.

BRIEF DESCRIPTION OF DRAWINGS

FIG. 3A illustrates cyclic voltammograms in different solutions; FIG. 3B illustrates a linear relationship between a cyclic voltammetry peak current and NaCl concentration; FIG. 3C illustrates a linear relationship between a cyclic voltammetry peak current and KCl concentration; and FIG. 3D illustrates a relationship between a peak current of cyclic voltammetry and the concentration of NaCl and KCl mixed solution.

FIG. 8A illustrates cyclic voltammograms of *Staphylococcus aureus* solutions at different concentrations; FIG. 8B illustrates a linear relationship between a peak current of cyclic voltammetry and concentration of *Staphylococcus aureus*; FIG. 8C illustrates a linear relationship between a peak current and concentration of *Staphylococcus aureus* when the concentration C of *Staphylococcus aureus* is taken as $1 \leq C \leq 10$ colony-forming units per milliliter (CFU/mL); and FIG. 8D illustrates a linear relationship between a peak current and concentration of *Staphylococcus*

*aureus* when the concentration C of *Staphylococcus aureus* is taken as $10^1 < C \leq 10^5$ CFU/mL.

DETAILED DESCRIPTION OF EMBODIMENTS

In order to facilitate the understanding of the disclosure, a more comprehensive and detailed description will be provided below, but the scope of protection of the disclosure is not limited to the following specific embodiments.

Unless otherwise defined, all technical terms used hereinafter have the same meanings as commonly understood by those skilled in the art. The technical terms used herein are only for the purpose of describing specific embodiments and are not intended to limit the scope of protection of the disclosure.

Unless otherwise specified, various raw materials, reagents, instruments, and equipment used in the disclosure can be purchased from the market or prepared through existing methods.

Embodiment 1

A microelectrode sensor for detecting *Staphylococcus aureus* is provided. The microelectrode sensor is a three-electrode system sensor with a counter electrode (CE, also referred to as auxiliary electrode) of platinum wire electrode, a reference electrode (RE) of Ag/AgCl electrode, and a working electrode (WE) of silver microelectrode modified by chitosan, catechol and *Staphylococcus aureus* aptamers.

In this embodiment, the working electrode takes the silver microelectrode as a matrix, chitosan is coated on the surface of the silver microelectrode, and catechol and *Staphylococcus aureus* aptamers are respectively grafted onto chitosan.

Figure 1:
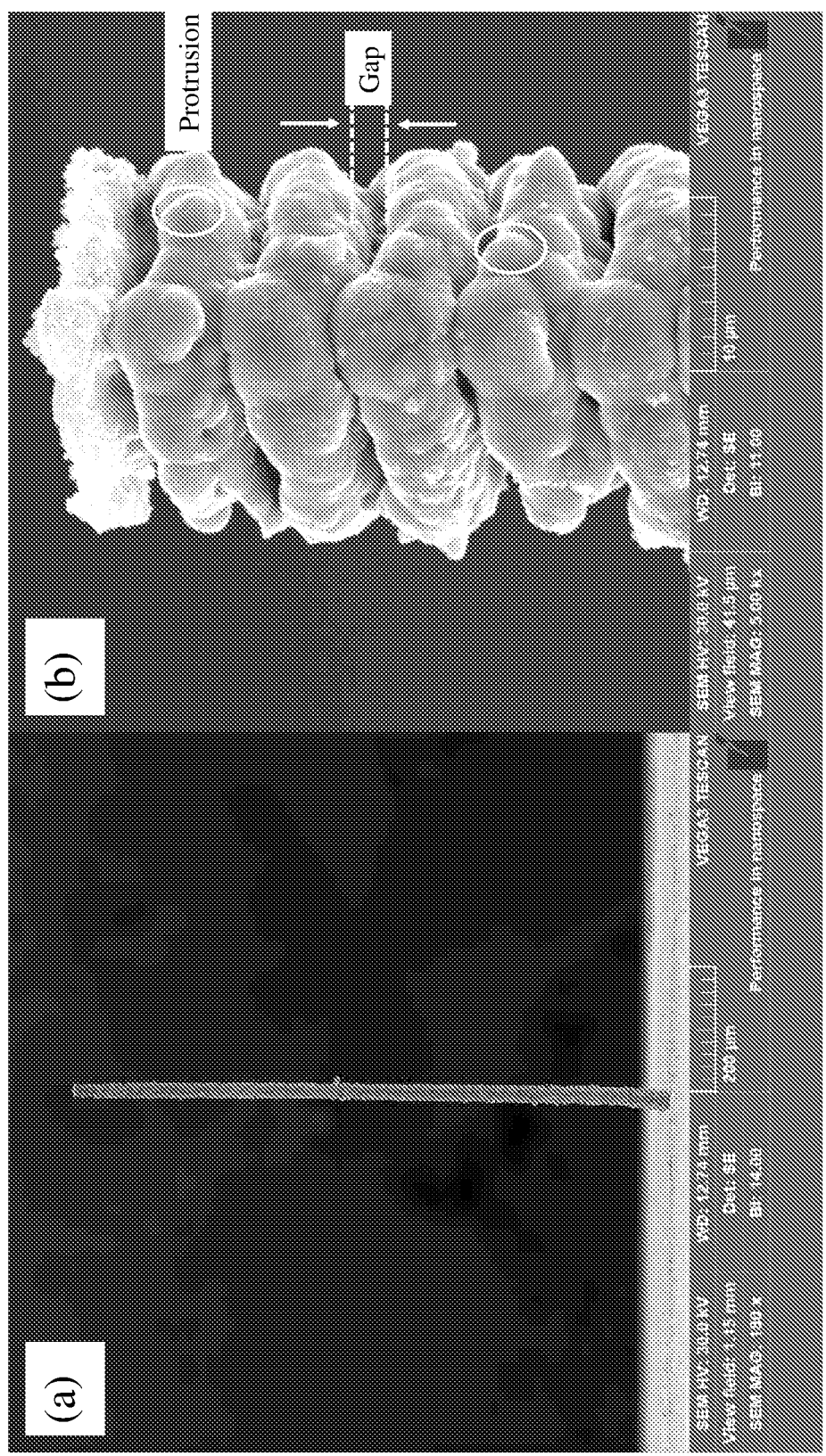
FIG. 1 illustrates a scanning electron microscope image of a silver microelectrode of the disclosure.
Figure 2:
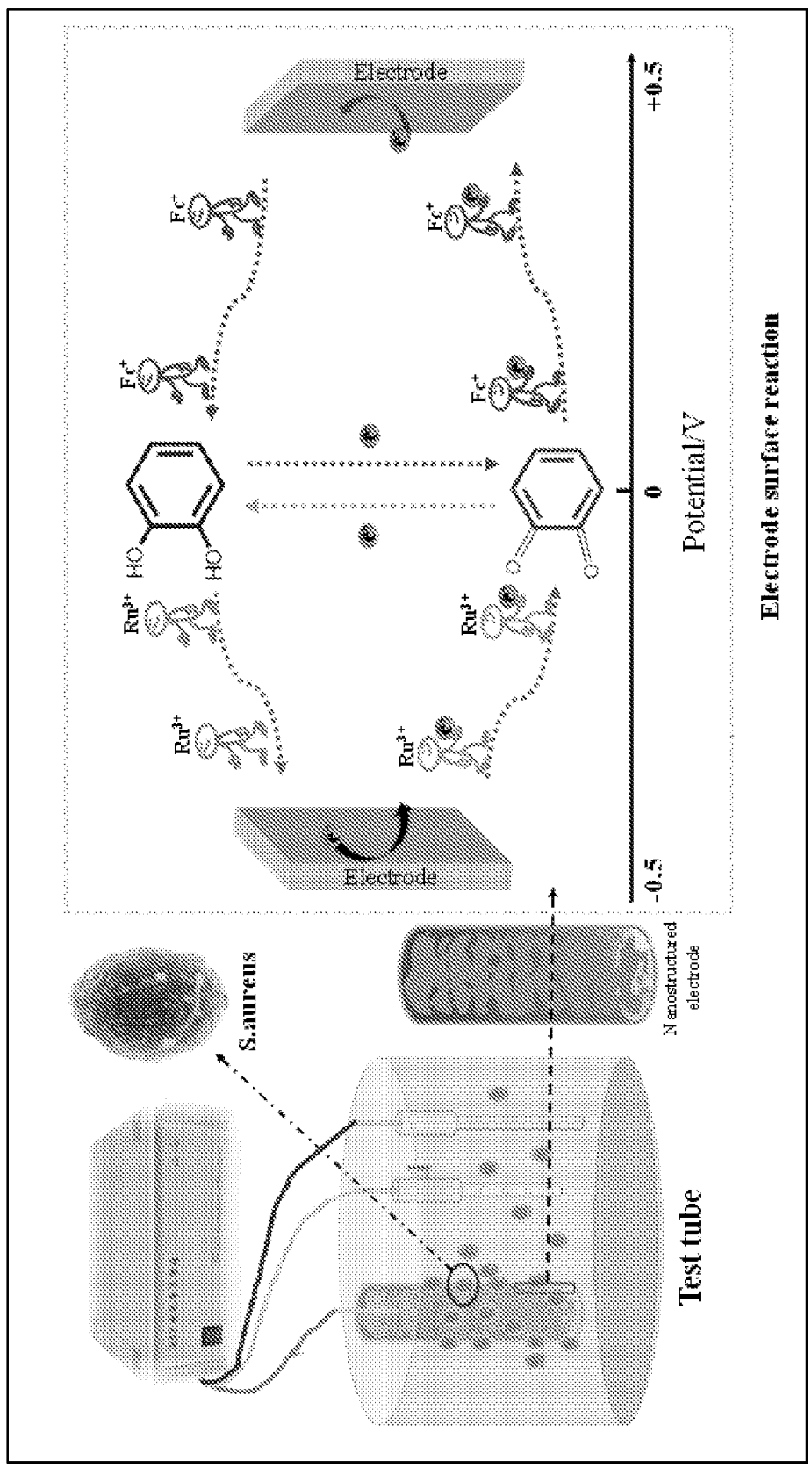
FIG. 2 illustrates amplification mechanism of a detection signal of the disclosure.

In this embodiment, based on the micro-capacitance principle, a modified layer is prepared on the electrode surface to amplify the detection signal, and an ultra-sensitive microelectrode sensor for detecting *Staphylococcus aureus* is constructed. The electrode modification process is the deposition of chitosan, the grafting of catechol, and immobilization of aptamers. The silver microelectrode is made using the maskless localized electrochemical deposition (LECD) method. As shown in FIG. 1, there are many micro/nano scale protrusions and gaps distributed on the surface of the electrode. The microstructure on the microelectrode greatly increases the specific surface area of the microelectrode and increases the surface current density of the microelectrode, thereby further amplifying the detection signal. The amplification mechanism of the detection signal is shown in FIG. 2. The catechol polymerized and grafted onto chitosan at the working electrode has two chemical states, namely the oxidized state (quinone) and the reduced state (catechol). Two media (Fc, $Ru^{3+/2+}$) are oxidized and reduced by electrodes respectively. Then, $Fc^+$ is reduced with catechol and $Ru^{2+}$ is immediately oxidized with quinone. Compared with the planar electrode, the nanostructured electrode further improves the charge transfer rate and enhances the signal amplification ability of the microelectrode. The aptamers are immobilized on the electrode through the reaction between the terminal aldehyde group and the amino group on chitosan. In the presence of *Staphylococcus aureus*, it is specifically captured by the aptamers and immobilized on the electrode. During the cyclic voltammetry (CV) test, the micro-nano structure on the surface of the silver microelectrode can generate a local high electric field, when the aptamers on the surface of the silver microelectrode capture *Staphylococcus aureus*, the $Cl^-$ in the bacterial can be leaked to the electrode surface under the action of the local high electric field strength, and when $Cl^-$ ions exists, the cathodic reduction peak of the silver microelectrode can be specifically enhanced between 0 to −0.1V, thus establishing a linear relationship between the increase of bacterial concentration and the enhancement of current signal, and achieving the goal of specific detection of bacteria.

Figure 3A:
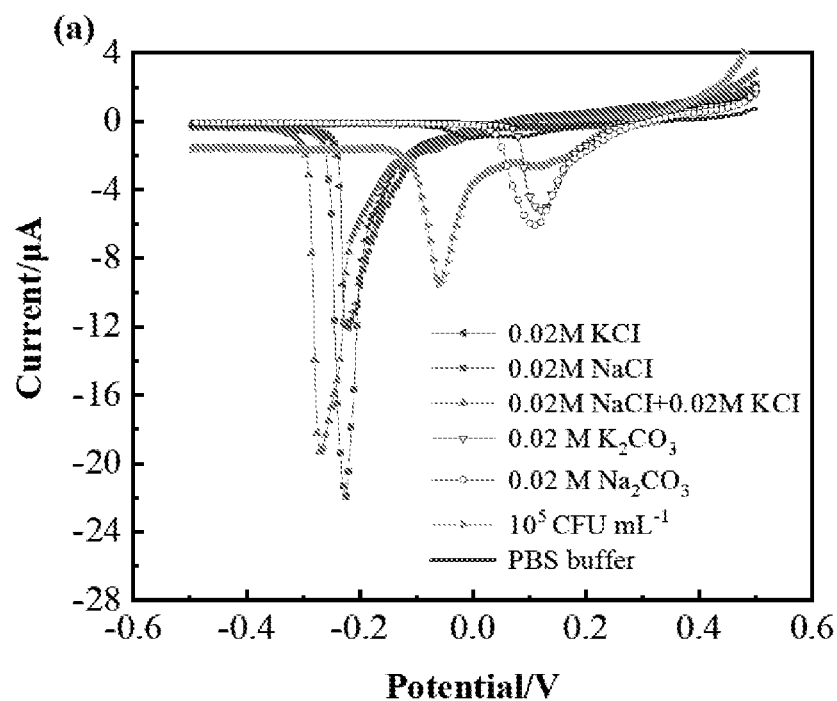
FIGS. 3A-3D illustrate comparison diagrams of electrochemical signal detection in simulated bacterial lysis solutions of the disclosure. specifically.
Figure 3B:
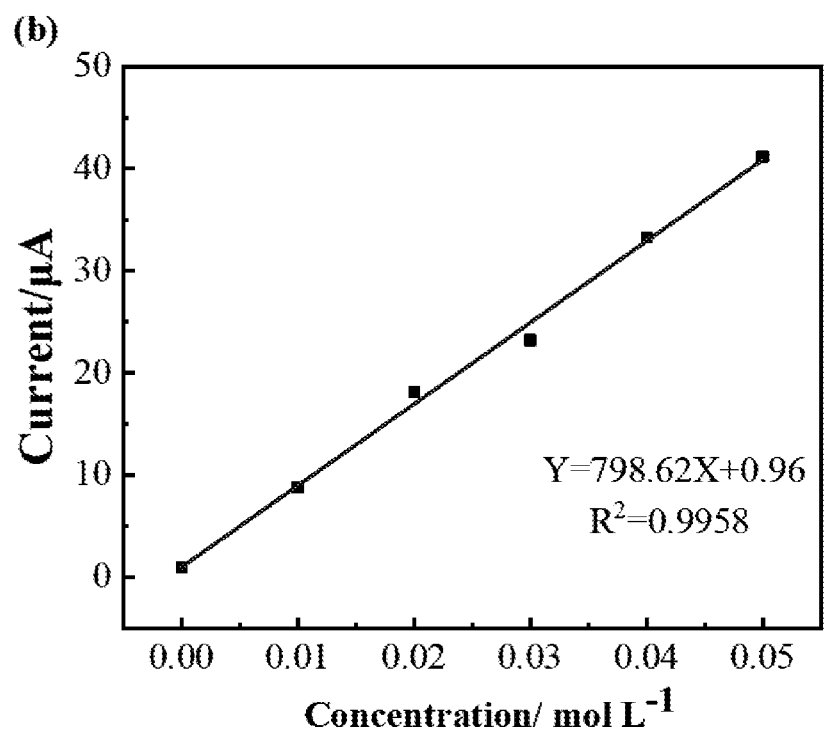
Figure 3C:
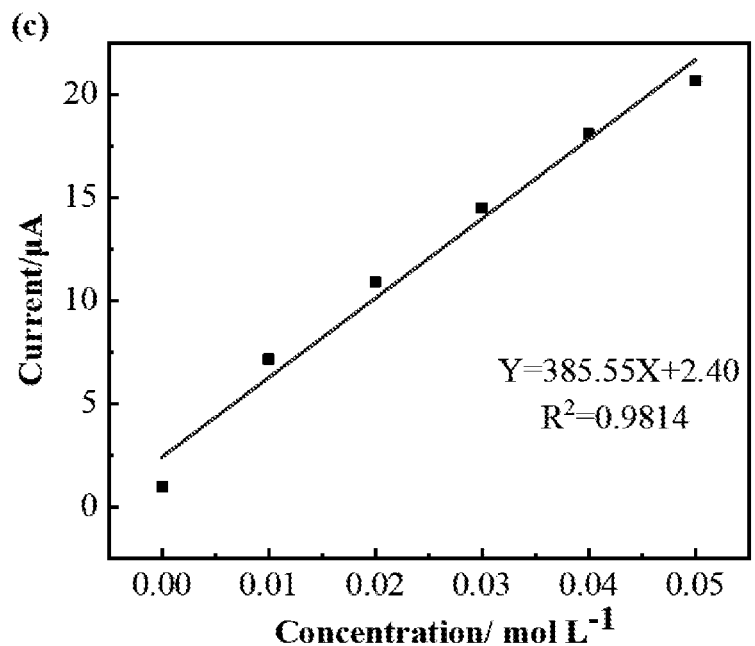
Figure 3D:
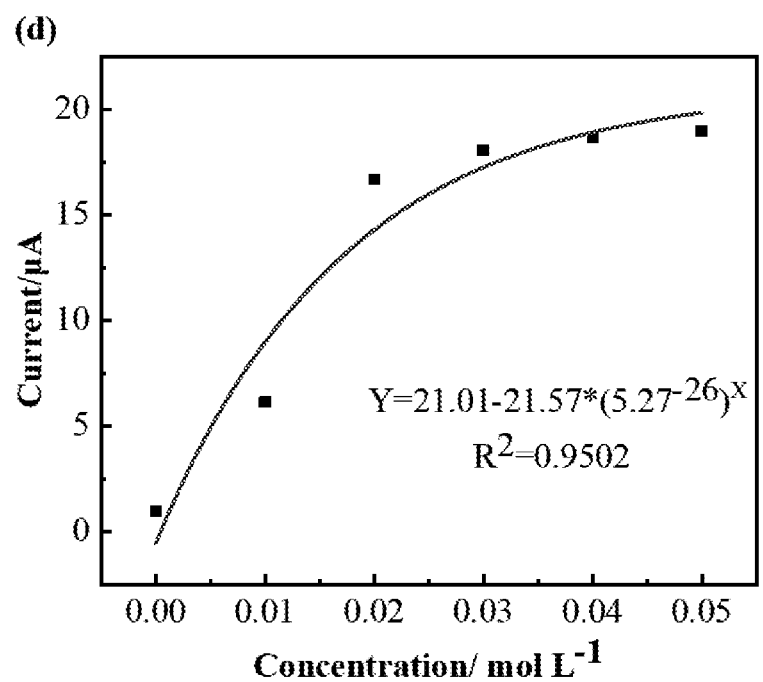

The main ionic components recorded in the related art in bacteria are $Na^+$, $K^+$, and $Cl^-$. In order to identify the possible signal response of the microelectrode sensor of the disclosure in the electrolyte containing $Na^+$, $K^+$, and $Cl^-$, validation experiments are also conducted in the disclosure, and cyclic voltammetry (CV) signals are recorded in NaCl, KCl, $K_2CO_3$ and $Na_2CO_3$ solutions, respectively. The experimental results are shown in FIGS. 3A-3D. The CV curves of NaCl and KCl are particularly similar to the CV signal in *Staphylococcus aureus* solution, as shown in FIG. 3A. Compared with the blank group, significant reduction peaks corresponding to NaCl or KCl are observed within the potential range of −0.5V to 0V. In this situation, reduction peaks of $K_2CO_3$ or $Na_2CO_3$ are observed within the potential range of 0V to 0.5V. It indicates that the reduction peak in the potential range of −0.5V to 0V in NaCl solution or KCl solution is most likely caused by the presence of $Cl^-$ rather than $K^+$ or $Na^+$, which further confirms that the leakage of intracellular $Cl^-$ is the reason for the appearance of the new peak when detecting *Staphylococcus aureus*.

Figure 4:
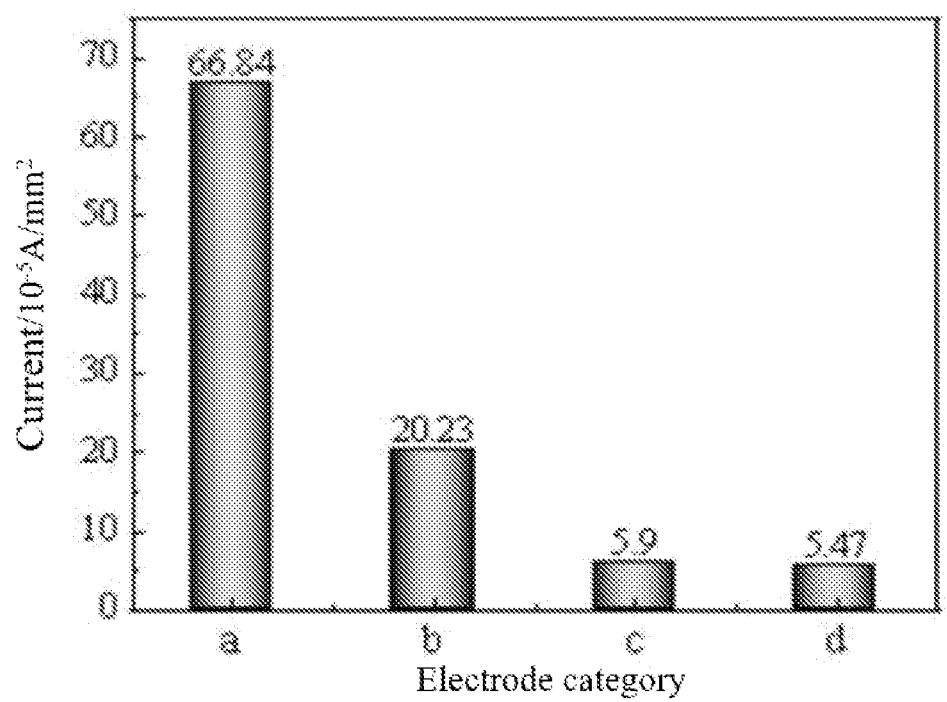
FIG. 4 illustrates a comparison diagram of current density detection of a working electrode of the disclosure, where a represents a microelectrode (diameter-0.03 millimeters abbreviated as mm), b represents a cylindrical microelectrode with a smooth surface (diameter=0.03 mm), c represents a silver column electrode (diameter=1 mm), and c represents a planar silver electrode (diameter=2 mm).

The disclosure also modifies the large electrode with the same condition parameters as the modified microelectrode and conducts the CV test to compare the current densities of the microelectrode and the large electrode, as shown in FIG. 4. It can be seen that under the same conditions, the current density of the silver microelectrode of the disclosure is significantly greater than that of other large electrodes.

Figure 5:
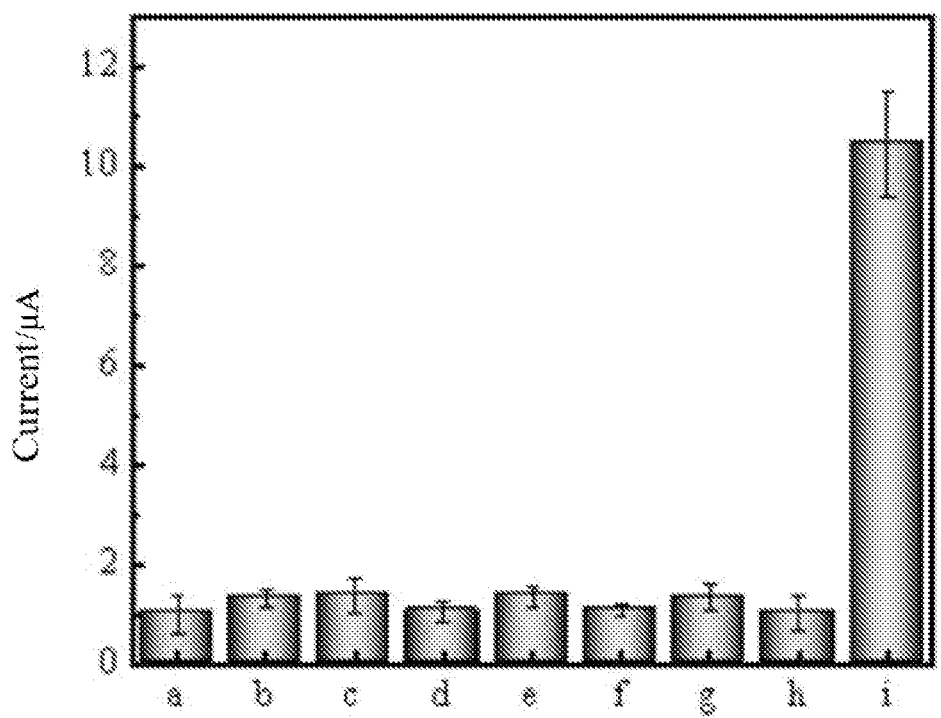
FIG. 5 illustrates a comparison diagram of specific detection results of the microelectrode sensor of the disclosure, where a represents blank, b represents *Escherichia coli*, c represents *Klebsiella*, d represents *Acinetobacter baumannii*, e represents *Stenotrophomonas maltophilia*, f represents *Streptococcus pyogenes*, g represents *Proteus mirabilis*, h represents *Burkholderia cepacia*, and i represents *Staphylococcus aureus*.
Figure 6:
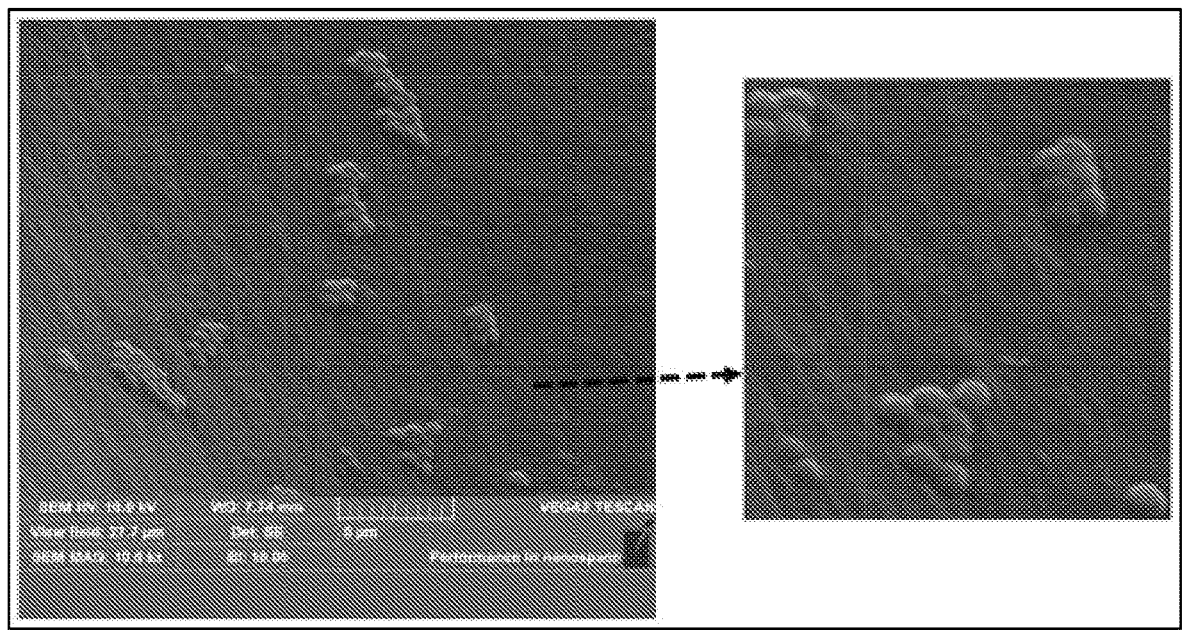
FIG. 6 illustrates a scanning electron microscope (SEM) image of *Staphylococcus aureus* on the electrode of the disclosure.

The microelectrode sensor of the disclosure also performs specific detection. By using the microelectrode sensor for CV detection in various bacterial solutions, the specificity of microelectrode sensing is analyzed, and the results are shown in FIG. 5. The microelectrode sensor has a strong current signal response to *Staphylococcus* only, indicating that the sensing specificity is good, and *Staphylococcus* can be accurately identified. The silver microelectrode after detecting bacteria is rinsed on the surface with buffer solution, then dried at room temperature, sprayed with gold and subjected to scanning electron microscope (SEM) test. The SEM images of *Staphylococcus aureus* on the silver microelectrode are obtained as shown in FIG. 6.

Embodiment 2

A method for preparing the microelectrode sensor for detecting *Staphylococcus aureus* in the embodiment 1 is provided, as shown in FIG. 3, including the following steps:
(1) Constructing a two-electrode system with a silver microelectrode as a working electrode and a platinum wire as an auxiliary electrode to electrochemically deposit chitosan on a surface of the working electrode to thereby obtain a chitosan-silver (Chi-Ag) electrode;
(2) Taking the Chi-Ag electrode obtained in the step (1) as a working electrode, Ag/AgCl as a reference electrode, and the platinum wire as a counter electrode, and electrochemically grafting catechol onto a surface of the Chi-Ag electrode; applying a 0.6V voltage on the working electrode for 500 seconds (s) through a CHI660e electrochemical workstation to graft the catechol onto the chitosan to thereby obtain a Cat-Chi-Ag electrode; washing the Cat-Chi-Ag electrode with ultrapure water and drying the washed Cat-Chi-Ag electrode with nitrogen flow; and (3) Soaking the Cat-Chi-Ag electrode in an aptamer solution, modifying the aptamers onto a surface of the Cat-Chi-Ag electrode through a reaction between an aldehyde group on the aptamers and an amino group on the chitosan, thereby forming an aptamer-modified electrode (Apt-Cat-Chi-Ag).

In this embodiment, the silver microelectrode in the step (1) is a silver microelectrode prepared in one step by a local electrodeposition method. The electrochemical deposition method of the step (1) is to place the silver microelectrode and the platinum wire in a chitosan solution for electrochemical deposition for 200 seconds; and then take out the deposited electrode, rinse the deposited electrode with ultrapure water, and dry the rinsed electrode at room temperature. The silver microelectrode is rinsed with deionized water and ethanol for 5 minutes before deposition, and then dried with nitrogen gas.

Figure 7:
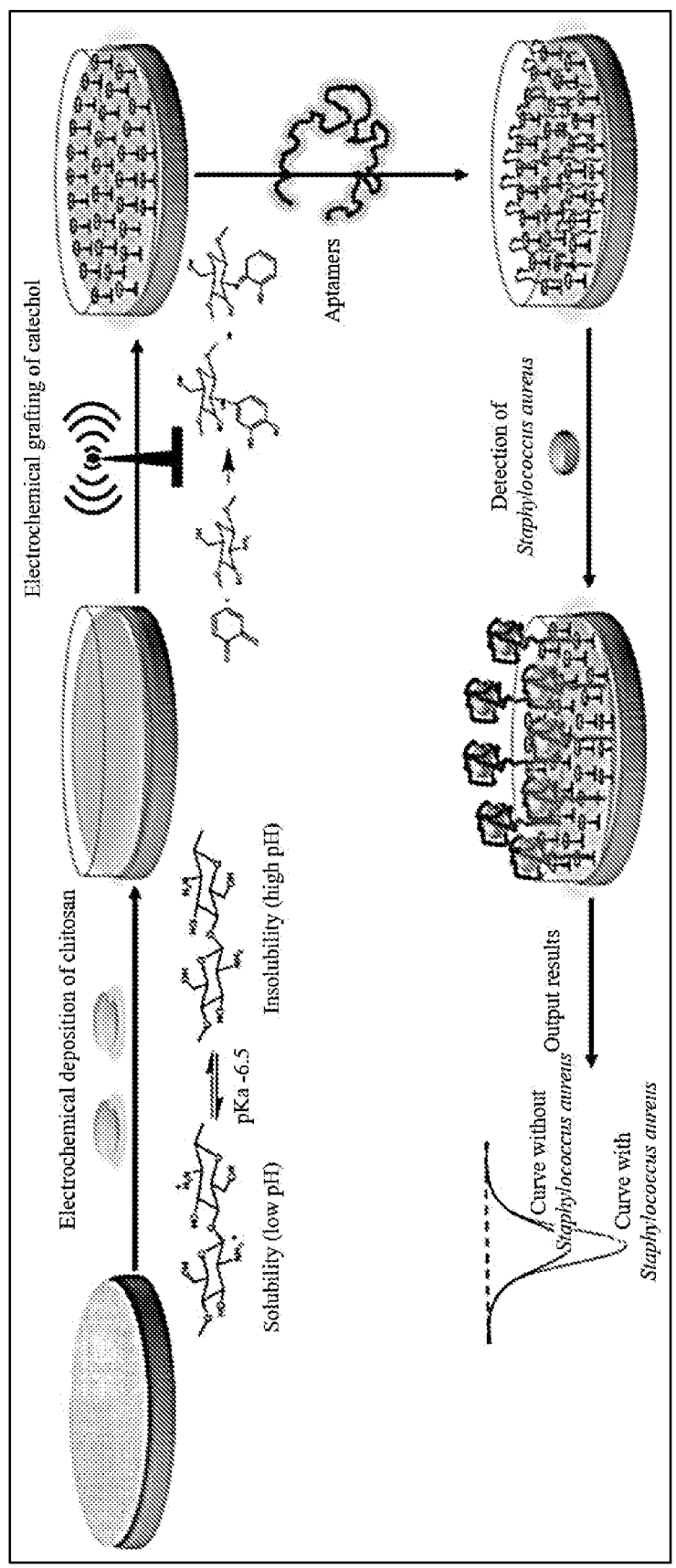
FIG. 7 illustrates a schematic diagram of an electrode modification process of the disclosure.
Figure 8A:
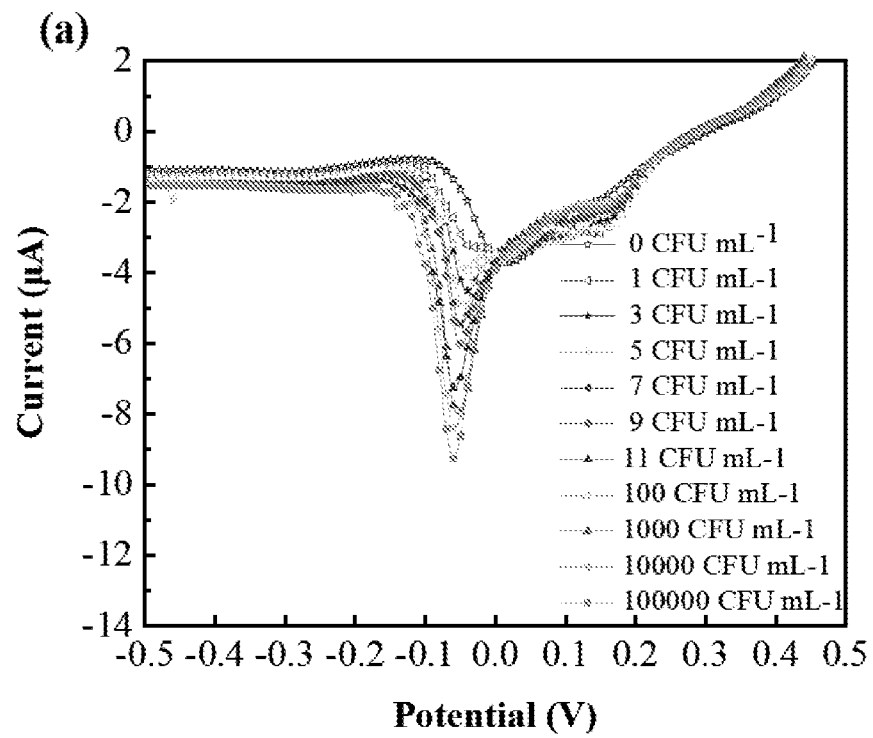
FIGS. 8A-8D illustrate detection results of the microelectrode sensor of the disclosure for *Staphylococcus aureus*. Specifically.
Figure 8B:
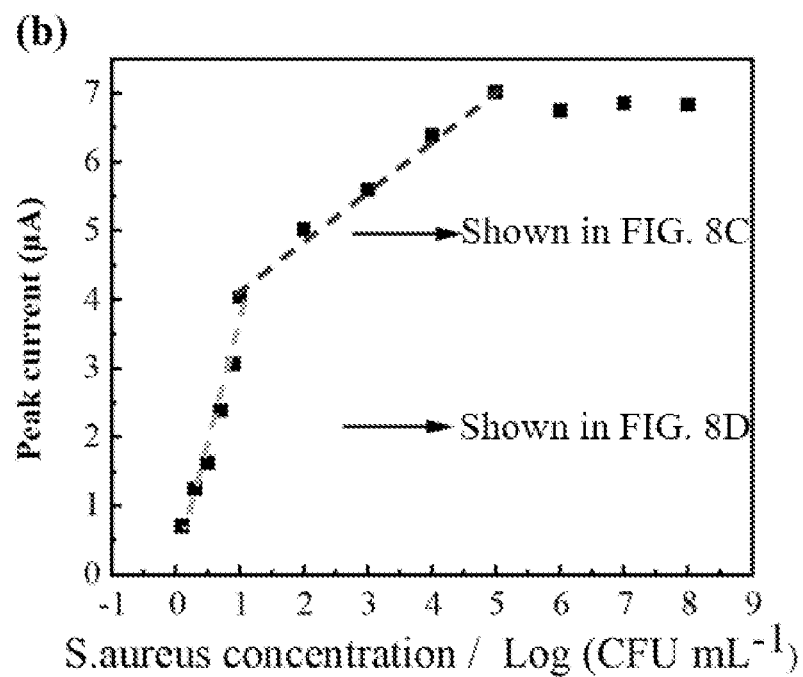
Figure 8C:
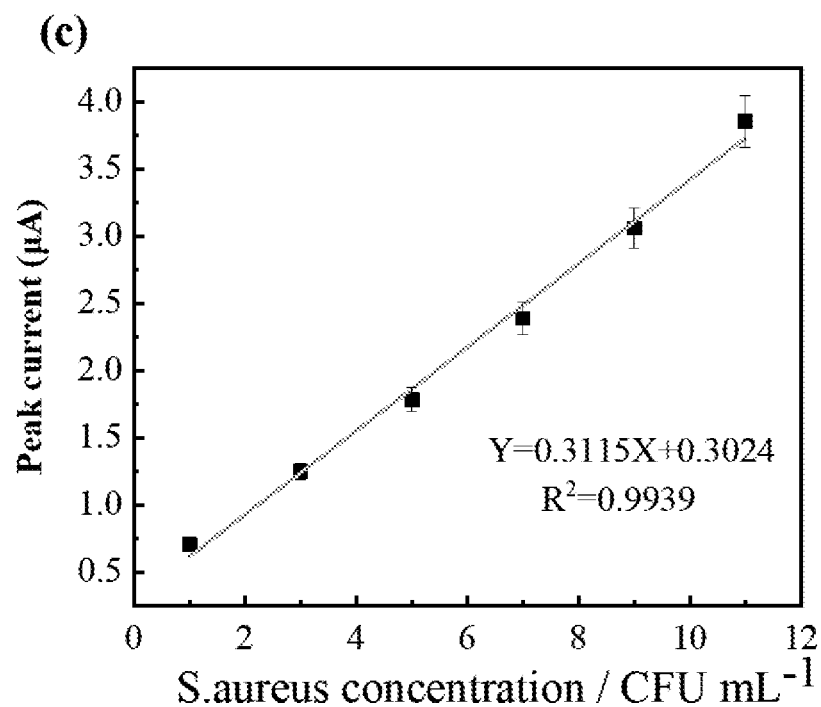
Figure 8D:
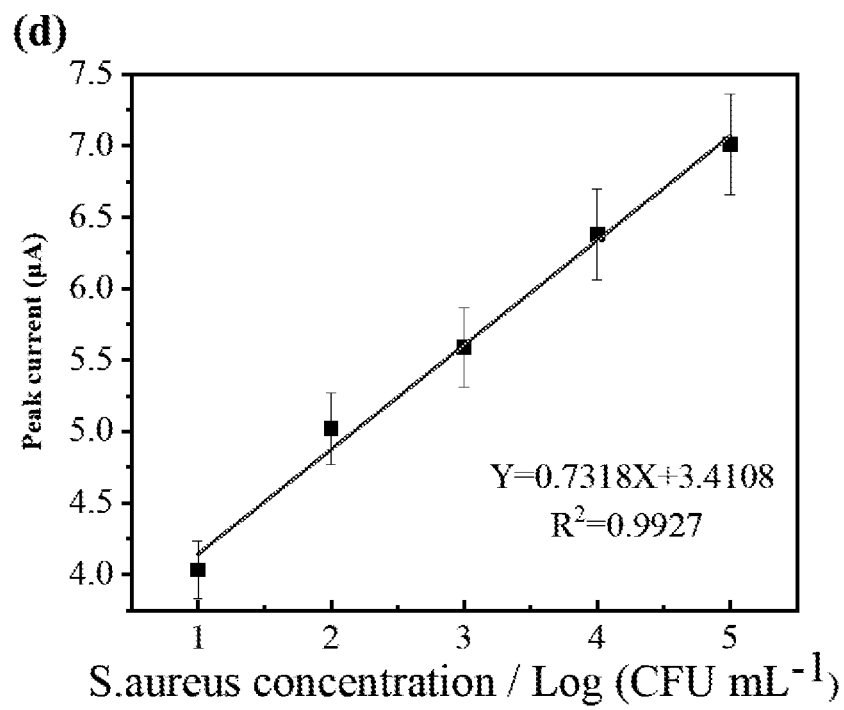

In this embodiment, the pH of the catechol solution in the step (2) is 7.0 and the concentration is 5 millimoles per liter (mM). Nitrogen is injected into the catechol solution before preparation for 30 minutes to remove air, and nitrogen is continuously injected during preparation. In this embodiment, the aptamer solution of the step (3) is prepared with PBS buffer (0.1 $MKH_2PO_4$:0.1 $MK_2HPO_4$=1:4, V/V); the incubation time is 12 hours, and the temperature is 0° C. After incubation, the prepared Apt-Cat-Chi-Ag electrode is rinsed with the PBS solution to remove the un-grafted aptamers. The electrode modification process is shown in FIG. 7.

Embodiment 3

A detection method based on the microelectrode sensor for detecting *Staphylococcus aureus* in the embodiment 1 is provided, including the following steps:

(a) Adding standard solutions of *Staphylococcus aureus* of respective concentrations into the $Fc-Ru^{3+/2+}$ double-electron medium solution of the microelectrode sensor, obtaining a peak current of a specific response signal of the silver electrode corresponding to the standard solution of each concentration using the cyclic voltammetry at room temperature, and establishing a standard curve equation according to a relationship between the concentration of *Staphylococcus aureus* and the peak current;

(b) Taking or preparing a sample solution to be detected;

(c) Detecting a peak current of a characteristic peak to be detected of the sample solution to be detected in the step (b) by cyclic voltammetry; and (d) Introducing the peak current obtained in the step (c) into the standard curve equation of the step (a) to calculate a concentration of *Staphylococcus aureus* in the sample solution to be detected.

In this embodiment, the standard curve equation in the step (a) is obtained by adding the standard solutions of *Staphylococcus aureus* of respective concentrations to the $Fc-Ru^{3+}$ double-electron medium solution of the microelectrode sensor. The standard curve equation is a two-section equation. When the concentration C of *Staphylococcus aureus* is taken as 1≤C≤10 colony-forming units per milliliter (CFU/mL), the standard curve equation is P (microampere abbreviated as µA)=0.3115 C(CFU/mL)+0.3024 ($R^2$=0.9939). When the concentration C of *Staphylococcus aureus* is taken as $10^1<C\leq10^5$ CFU/mL, the standard curve equation is P (µA)=0.7318 log[C](CFU/mL)+3.4108 ($R^2$=0.9927).

In this embodiment, the $Fc-Ru^{3+/2+}$ double-electron medium solution contains 50 micromoles per liter (µM) Fc, 50 µM $Ru^{3+}$ and PBS buffer. Before the CV test, the $Fc-Ru^{3+/2+}$ double-electron medium solution after adding *Staphylococcus aureus* solution is degassed with nitrogen for 30 minutes to eliminate the interference of oxygen reduction. The solution is continuously filled with nitrogen during the test. On the one hand, an inert environment is provided for the test system, and on the other hand, micropower is provided for the test solution, so that the probability that bacteria are captured is increased. The scanning voltage of CV ranges from −0.5V to +0.5V. The CV curve is recorded until the signal is stable.

As shown in FIGS. 8A-8D, the linear range of the microelectrode sensor of the disclosure is 1-$10^5$ CFU/mL, and the detection limit is 1 CFU/mL.

The above is only a preferred embodiment of the disclosure and does not impose any formal limitations on it. Therefore, any simple modifications, equivalent changes, and modifications made to the above embodiments based on the technical essence of the disclosure, which are not separated from the technical solution of the disclosure, shall fall within the scope of protection of the technical solution of the disclosure.

What is claimed is:

1. A microelectrode sensor for detecting *Staphylococcus aureus*, wherein the microelectrode sensor is a three-electrode system sensor with a platinum wire electrode as a counter electrode and a silver/silver chloride (Ag/AgCl) electrode as a reference electrode;

wherein a working electrode is a silver microelectrode modified by chitosan, catechol and *Staphylococcus aureus* aptamers; the working electrode takes the silver microelectrode as a matrix, is coated with the chitosan on a surface of the silver microelectrode and grafted with the catechol and the *Staphylococcus aureus* aptamers onto the chitosan individually; and the surface of the silver microelectrode is distributed with micro and nano scale protrusions and gaps;

wherein the modified silver microelectrode of the microelectrode sensor is modified by:

step (1), constructing a two-electrode system with the silver microelectrode as a working electrode and a platinum wire as an auxiliary electrode to electrochemically deposit the chitosan on a surface of the working electrode to thereby obtain a chitosan-silver (Chi-Ag) electrode;

step (2), taking the Chi-Ag electrode obtained in the step (1) as a working electrode, Ag/AgCl as the reference electrode, and the platinum wire as the counter electrode, and electrochemically grafting the catechol onto a surface of the Chi-Ag electrode to thereby obtain a catechol-chitosan-silver (Cat-Chi-Ag) electrode; and step (3), soaking the Cat-Chi-Ag electrode in an aptamer solution, modifying the aptamers onto a surface of the Cat-Chi-Ag electrode through a reaction between an aldehyde group on the aptamers and an amino group on the chitosan, thereby forming an aptamer-modified electrode;

wherein the silver microelectrode in the step (1) is a silver microelectrode prepared in one step by using a local electrodeposition method;

wherein the electrochemical deposition in the step (1) is to place the silver microelectrode in a chitosan solution for electrochemical deposition for 200-500 seconds, and then take out the deposited electrode, rinse the deposited electrode with ultrapure water, and dry the rinsed electrode at room temperature;

wherein a pH value of the catechol solution used for grafting the catechol in the step (2) is in a range of 7.0-7.6, with a concentration in a range of 4-5 millimoles per liter (mM); nitrogen gas is injected to the catechol solution before preparation to remove air, and the nitrogen gas is continuously injected during the preparation process;

wherein a linear range of the microelectrode sensor is 1-10$^5$ colony-forming units per milliliter (CFU/mL), and a detection limit of the microelectrode sensor is 1 CFU/mL.

2. The microelectrode sensor according to claim 1, wherein the aptamer solution in the step (3) is a solution with the aptamers dissolved in a phosphate-buffered saline (PBS) buffer, with a modification time in a range of 8-24 hours and a temperature in a range of 0-25° C.

3. An application method of the microelectrode sensor for detecting *Staphylococcus aureus* according to claim 1, comprising:

(a) acquiring peak currents of specific response signals of the aptamer modified electrode corresponding to standard solutions of *Staphylococcus aureus* of respective concentrations by cyclic voltammetry test at room temperature, and establishing a standard curve equation according to a relationship between the concentrations of *Staphylococcus aureus* and the peak currents;

(b) taking or preparing a sample solution to be detected;

(c) detecting a peak current of a characteristic peak of the sample solution to be detected in the step (b) by cyclic voltammetry; and (d) substituting the peak current obtained in the step (c) into the standard curve equation in the step (a) to calculate a concentration of *Staphylococcus aureus* in the sample solution to be detected.

4. The application method according to claim 3, wherein the standard curve equation in the step (a) is obtained by adding the standard solutions of *Staphylococcus aureus* of respective concentrations to a ferrocene-ruthenium$^{3+}$ (Fc-Ru$^{3+}$) double-electron medium solution of the microelectrode sensor, and the standard curve equation is a two-section equation;

when the concentration C of *Staphylococcus aureus* is taken as 1≤C≤10 CFU/mL, the standard curve equation is P=0.3115C+0.3024, where R$^2$=0.9939, P represents the peak current, in units of microampere (μA), and C represents the concentration of *Staphylococcus aureus*, in CFU/mL;

when the concentration C of *Staphylococcus aureus* is taken as 10$^1$<C≤10$^5$ CFU/mL, the standard curve equation is P=0.7318 log[C]+3.4108, where R$^2$=0.9927, P represents the peak current, in units of μA, and C represents the concentration of *Staphylococcus aureus*, in CFU/mL.

5. The application method according to claim 4, wherein the Fc-Ru$^{3+}$ double-electron medium solution comprises 50 micromoles per liter (μM) Fc, 50 μM ruthenium$^{3+}$ (Ru$^{3+}$), and a PBS buffer; before the cyclic voltammetry test, the Fc-Ru$^{3+}$ double-electron medium solution after adding the *Staphylococcus aureus* solution is degassed with nitrogen, and continuously injected nitrogen during the cyclic voltammetry test.

6. An application method of a microelectrode sensor for detecting *Staphylococcus aureus*, wherein the microelectrode sensor is a three-electrode system sensor with a platinum wire electrode as a counter electrode and a silver/silver chloride (Ag/AgCl) electrode as a reference electrode; a working electrode is a silver microelectrode modified by chitosan, catechol and *Staphylococcus aureus* aptamers; the working electrode takes the silver microelectrode as a matrix, is coated with the chitosan on a surface of the silver microelectrode and grafted with the catechol and the *Staphylococcus aureus* aptamers onto the chitosan individually; and the surface of the silver microelectrode is distributed with micro and nano scale protrusions and gaps; and the application method comprises:

(a) acquiring peak currents of specific response signals of an aptamer modified electrode corresponding to standard solutions of *Staphylococcus aureus* of respective concentrations by cyclic voltammetry test at room temperature, and establishing a standard curve equation according to a relationship between the concentrations of *Staphylococcus aureus* and the peak currents;

(b) taking or preparing a sample solution to be detected;

(c) detecting a peak current of a characteristic peak of the sample solution to be detected in the step (b) by cyclic voltammetry; and (d) substituting the peak current obtained in the step (c) into the standard curve equation in the step (a) to calculate a concentration of *Staphylococcus aureus* in the sample solution to be detected;

wherein the standard curve equation in the step (a) is obtained by adding the standard solutions of *Staphylococcus aureus* of respective concentrations to a Fc-R$^u$3+ double-electron medium solution of the microelectrode sensor, and the standard curve equation is a two-section equation;

when the concentration C of *Staphylococcus aureus* is taken as 1<C<10 CFU/mL, the standard curve equation is P=0.3115C+0.3024, where R$^2$=0.9939, P represents the peak current, in units of microampere (μA), and C represents the concentration of *Staphylococcus aureus*, in CFU/mL;

when the concentration C of *Staphylococcus aureus* is taken as 10$^1$<C<10$^5$ CFU/mL, the standard curve equation is P=0.7318 log[C]+3.4108, where R$^2$=0.9927, P represents the peak current, in units of μA, and C represents the concentration of *Staphylococcus aureus*, in CFU/mL.

7. A microelectrode sensor for detecting *Staphylococcus aureus*, wherein the microelectrode sensor is a three-electrode system sensor with a platinum wire electrode as a counter electrode and an Ag/AgCl electrode as a reference electrode;

wherein a working electrode is a silver microelectrode modified by chitosan, catechol and *Staphylococcus aureus* aptamers; the working electrode takes the silver microelectrode as a matrix, is coated with the chitosan on a surface of the silver microelectrode and grafted with the catechol and the *Staphylococcus aureus* aptamers onto the chitosan individually; and the surface of the silver microelectrode is distributed with micro and nano scale protrusions and gaps;

wherein a linear range of the microelectrode sensor is 1-10$^5$ CFU/mL, and a detection limit of the microelectrode sensor is 1 CFU/mL;

wherein a cathodic reduction peak of the silver microelectrode is specifically enhanced between 0 to −0.1 volts (V).

* * * * *